Feb. 6, 1968   J. V. OLIVEAU ET AL   3,367,366
DISCONNECT WITH MINIMUM INCLUSION
Filed Oct. 11, 1965
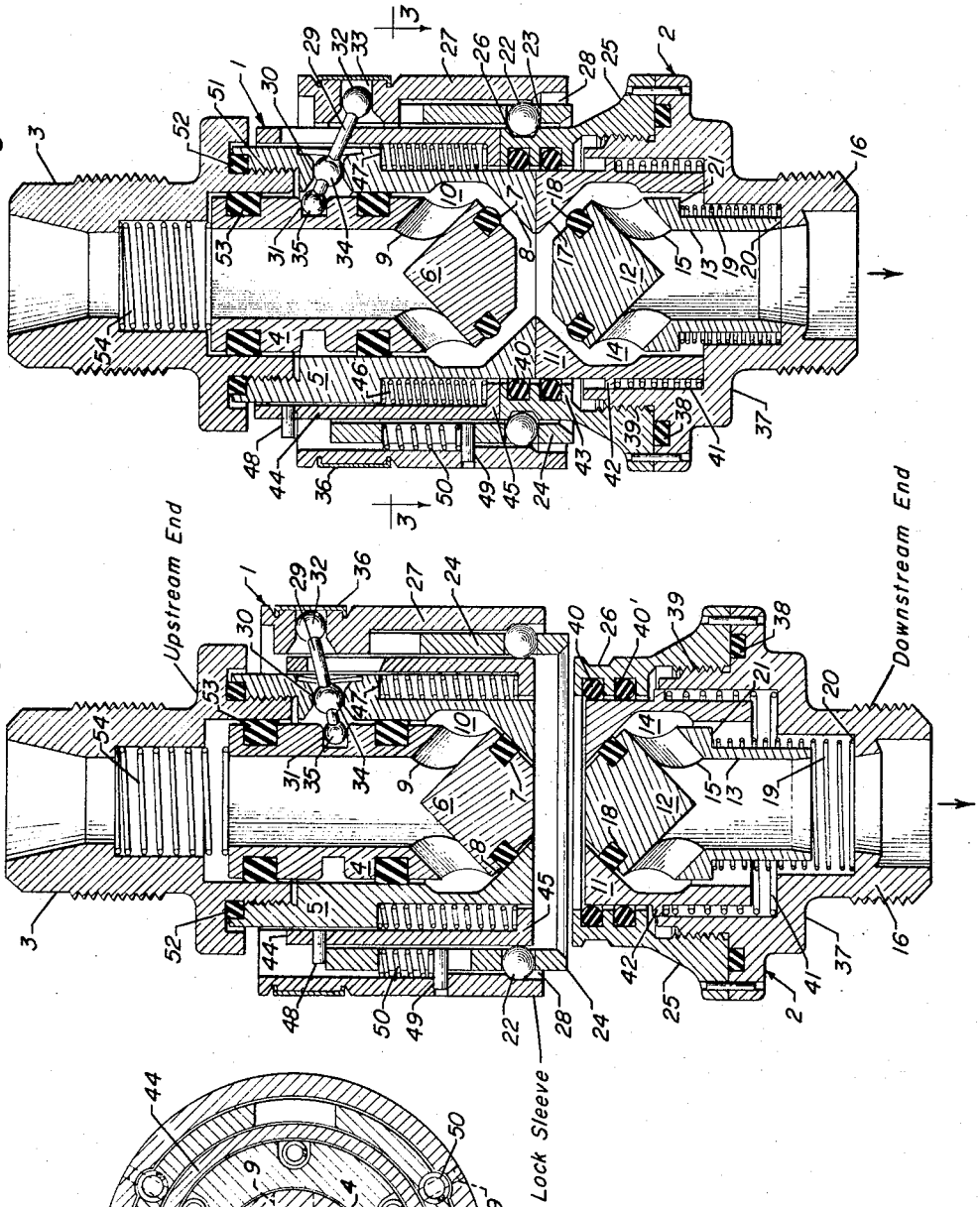
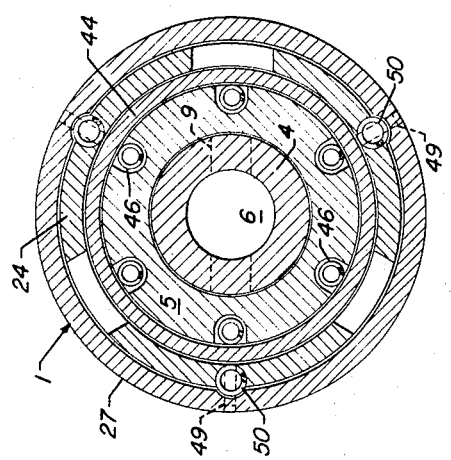
INVENTORS:
John V. Oliveau
Henry B. Klatte
BY:
James R. Hoatson Jr.
Philip T. Liggett
ATTORNEYS United States Patent Office  3,367,366
Patented Feb. 6, 1968

3,367,366
DISCONNECT WITH MINIMUM INCLUSION
John V. Oliveau, Greenwich, Conn., and Henry B. Klatte,
Yonkers, N.Y., assignors to Universal Oil Products
Company, Des Plaines, Ill., a corporation of Delaware
Filed Oct. 11, 1965, Ser. No. 494,668
5 Claims. (Cl. 137—614.05)

The present invention relates to an improved disconnect design providing for the minimum inclusion of air into a fluid stream which is to be passed therethrough.

Various types of disconnects are in present use in fluid supply lines, etc., for aircraft pilots or other personnel in a plane in order that they may be readily disconnected from the aircraft upon bailing out or being ejected, although similar disconnect units may be used for services other than in aircraft equipment. A typical disconnect has at least two sections, one portion being an upstream end or an aircraft end adapted to remain with the aircraft supply line, and the other section being a downstream end or a pilot end which is adapted to connect the pilot or his suit to the aircraft. Most disconnects provide for a shut-off of fluid flow from the various aircraft ends of the supply lines and for closing off the ends of the lines to the pilot. However, most disconnects do not have adequate design characteristics to provide (1) minimum loss of fluid upon disconnection and (2) a minimum air inclusion during recoupling. In connection with certain hydraulic lines or with a fuel line in aircraft installations, as well as with harmful fluid streams in a processing plant, it may be considered highly undesirable or hazardous to have any air inclusion into the fluid lines at the time of making the coupling of the line.

It is thus a desirable and principal feature of the improved design of the present invention to provide flat mating faces for the two halves of the disconnect unit whereby there is minimization of air inclusion into the disconnect and into the fluid line, as well as the provision for a small linear motion of a locking sleeve to effect a coupling of the two halves or, conversely, a rapid disconnection of the unit.

It is also a feature of the present invention to provide an improved design having internal poppet type valve means within each portion of the disconnect unit which can prevent any backflow through the device as well as provide positionings which result in flat face to face configurations that will substantially fill the space between the two parts for excluding all air before sealing of the unit occurs. Still another feature of the present improved disconnect design is to have both a ball lock arrangement which connects the two portions of the device and a lever arm movement connective to the upstream valving means which is operable by causing a short linear movement of an external lock sleeve such that there is a resulting dual effect of a shut-off of the fluid supply through the unit and a quick disconnect of the two parts of the unit. Other advantages and features of the improved design will be noted upon reference to the accompanying drawing and the following description thereof.

FIGURE 1 of the drawing is a diagrammatic longitudinal view through one embodiment of improved disconnect unit, showing the two portions thereof separated and the valve members closed.

FIGURE 2 of the drawing shows the disconnect in a connected operating state with the internal valve members open.

FIGURE 3 of the drawing is a cross-sectional view through one portion of the disconnect unit, as indicated by the line 3—3 in FIGURE 2 of the drawing.

Referring now to the drawing, there is indicated a disconnect with an upstream end 1 and a downstream end 2. Fluid flow, which for example may comprise a hydraulic pressure stream, enters the upstream end fitting 3 and passes internally through a hollow portion of slidable upstream valve member 4 which in turn is indicated as being within an upstream body section 5. The upstream end of the valve member 4 is provided with a valve plug portion 6 having a continuous ring like seal member 7 which is adapted to bear a tapered seating area 8 on the internal end portion of body section 5. In a connected and operable position, as best shown in FIGURE 2, the fluid flow passes from inside of the valve member 4 into passageways or openings 9 and thence into the passageway 10 around plug member 6 so as to enter the inside of a downstream internal body section 11 to impinge against plug portion 12 of a downstream poppet valve member 13. Thus fluid flow passes around plug member 12 in a passageway 14 to enter holes 15 and into the internal hollow portion of the stem of valve member 13 to subsequently be discharged from a downstream end fitting 16.

In a similar construction and arrangement as shown for valve section 5, there is provided within the body section 11 a tapered seating surface 17 which is adapted to receive the engagement of seal member 18 in plug member 12 and provide a stoppage of fluid flow. A compression spring 19 extending between a shoulder portion 20 in end fitting 16 and a shoulder portion 21 on valve member 13 provides for the normal biasing or urging of plug member 12, with seal 18, against the seat 17 of the internal body section 11, however, after there is a connection between the two parts of the disconnect device and an open up stream valve member 4, the fluid pressure against the upstream end of the plug member 12 will cause the valve member 13 to unseat into an open position. The spring member 19 will of course have to be selected and sized to have the proper spring-action to provide for the poppet type of closing of the plug 12 against seat 17 when the fluid flow is stopped and to remain open when being subjected to the operating fluid pressure of the liquid passing through the disconnect unit.

The attachment and disengagement of the two portions of the disconnect unit are shown, in the present embodiment, to be accomplished through the use of spaced locking ball members 22 which are retained within openings 23 of a ring portion 24 on the upstream end of the disconnect unit. The outer periphery of a portion of the body section 25 on the downstream section of the unit is in turn provided with ball-groove means 26 to permit the engagement of ball members 22. The locking, or unlocking of ball members 22 within grooves 26 is accomplished by the action of a slidable lock sleeve 27 which circumscribes ring 24. When the lock sleeve 27 is pulled in the direction of the arrow toward the upstream end of the disconnect unit, as shown in the position of FIGURE 2 of the drawing, then the ball members 22 move into the larger diameter internal recessed section 28, which in turn provides that the ball members 22 are free of engagement with the grooves 26 on the downstream disconnect section and provide that the ring portion 24 be slidable over the external periphery of downstream body section 25 for the disengagement of the two sections of the unit.

At the same time that the lock sleeve 27 is pulled in an upstream direction it will be noted that lever arm means 29, passing through a seat 30 in body section 5 and extening into a groove 31 of valve member 4, will cause the latter to move in the opposing direction and in turn provide that the plug member 6 and seal member 7 will engage against the seating section 8 of body member 5. The outer end portion 32 of the lever arm 29 is spherical and is held within a hole or passageway 33 of lock sleeve 27 such that the end may move radially outwardly while undergoing angular movement as the lock sleeve 27 is caused to move back and forth in the disconnecting and connecting positions. Similarly, a center pivot portion 34 and a spherical portion 35 of lever arm 29 is provided with curved portions to permit easy radial motion while the arm is moved through a given arc as the lock sleeve is moved from one position to another. A strap spring 36 is shown circumscribing the lock sleeve 27 over the area of the end portions 32 of the lever arm means 29 such that the movement of the sleeve 27 may have a "snap action" as it is moved in either direction. In other words, the end portion 32 of arm member 29 is sized so as to have a length which will slidably bear against spring 36 as the lock sleeve is pulled in the upstream direction to disengage the sections of the unit and to close the upstream valve member 4. Thus, when the lock sleeve is being moved in a downstream direction, there will be a biased quick movement of all of the sliding sections to provide a rapid disengagement or recoupling of sections and a fast opening of the valve member 4 in the upstream body section.

In effecting the engagement of the two portions of the disconnect unit, it will be noted that initially the flush faces of internal body section 5, plug portion 6 and a flange section 45 will meet the opposing flush faces of body sections 11 and 25 and of plug portion 12 of the downstream half of the unit. Thus, there is substantial exclusion of all air in the disconnect and between the two halves before actual sealing or engagement takes place. The continued axial movement of the two halves toward each other causes the end of the annular body section 5 to enter into the downstream body section 25 and into the O-ring 40 to thereby seal the mating line, or parting line, between the two faces of the unit. Further axial movement of the parts will "bottom" the internal body section 11 and fix the positioning of the parting line between the seal rings 40 and a second seal ring 40'. Also, there will be a positioning of ball members 22 opposite the groove 26 in body section 25.

In effecting the final engagement of the two portions of the disconnect unit, it will be noted that the downstream internal surface of the lock sleeve 27, just above the recess section 28, will force and hold the ball members 22 into the groove means 28 so as to provide a tight fixed locking of the sections. At the same time the upstream internal valve member 4 will be caused by the arm member 29 to move in an upstream direction and open plug member 6 from the seat section 8 so as to permit fluid flow through passageway 10 and against plug member 12 of the downstream valve means 13. Thus, fluid flow may continue through passageway 14, the holes 15, and into the hollow stem valve means 13 for discharge through the end fitting 16 by compressing spring 19.

For purposes of effecting the manufacture and assembly of the sections of the disconnect unit, there may be two or more portions to each of the aircraft and pilot end sections of the disconnect. For example, the lower downstream end of the disconnect is provided with a flanged member 37 adapted to hold a seal or gasket member 38 and a threaded section 39 in turn adapted to effect the attachment of the external body section 25. The latter has external grooves 26 adapted to hold the ball lock members 22 for engagement with the aircraft end of the disconnect. The body section 25 also has internal grooves to hold O-rings 40 and 40'. Such construction permits the outer downstream body section to be formed in two separate parts and also provides for a movable or slidable body section 11 that can move with section 5 for a short distance as the latter is either inserted or withdrawn from within the periphery of upper seal ring 40 upon effecting a connection or disengagement of the two parts of the disconnect unit. The upstream movement of the internal body ring 11 is provided by compression spring 41 bearing against an external flange section or shoulder 42 which projects outwardly from the exterior diameter of ring member 11. The upstream movement of the latter is of course limited by the contact of the projecting shoulder 42 against the downstream face of internally projecting shoulder portion 43 of body section 25 as body section 5 is pulled out with the upstream half of the unit. The upstream movement and closing of the downstream poppet type valve member 13 against seat 17, is of course accomplished when the lock sleeve 27 is moved to make a disengagement of the unit sections and there has been a stoppage of fluid flow and pressure around the upstream plug portion 6.

In a special construction, as provided by the present illustrated embodiment, there is shown a cylindrical ring member 44 with an inwardly turned flange section 45 which encompasses the upstream body section 5 and slides longitudinally with respect thereto by the operation of springs 46 positioned between the flanged section 45 and shoulder portions 47 on the body section 5. This arrangement permits the lower flange portion 45 to remain in engagement with the upstream end of the body section 25 on the pilot end of the unit during the initial stage of the disengagement of the two portions of the disconnect and thus provide a lower wall portion which will retain the ball members 22 in the slots 23 after the disengagement, as best shown in FIGURE 2 of the drawing. Suitable pin means 48 at the upstream end of the cylindrical member 44 provides engagement with the end of ring member 24 so that there is a restriction or limitation on the downward movement of the lower flanged section 45 and it is precluded from disengagement from the aircraft end of the disconnect. In other words, the lower flanged section 45 need not move in a downstream direction any further than that necessary to hold the ball members 22 in their respective slots or holes 23.

Suitable horizontal pin means 49 is also provided between the outer lock sleeve 27 and compression spring means 50 within slotted openings of the ring means 24. Thus, the latter is retained in assembly with the upstream end of the disconnect unit between pin means 48 and 49, as well as concentrically between the cylindrical ring member 44 and the lock sleeve 27. The "snap action" of strap spring 36 will tend to hold the arm member 29 in a horizontal position between the concentric ring sections of the disconnect unit while the lock sleeve is in the retracted position. On the other hand, when the two portions of the disconnect unit are in contact with one another and the lock sleeve 27 is moved in a downstream direction, where there will be a compression of the spring means 46 by the flange 45 bearing against the downstream body section 25, then there will be an urging of the ball members 42 into the ball-groove means 26 of section 25 by the internal wall surface of lock sleeve 27.

Again for assembly purposes, there is indicated a threaded connection 51 between body section 5 and the upstream fluid inlet end section 3 with a seal ring 52 retained in a recess means at the upstream end of body section 5. Suitable O-rings or gasket means 53 are also shown at spaced sections around the periphery of the slidable valve member 4 and bearing against the inside wall surface of body section 5 so as to provide a suitable fluid seal between the two sections. A compression spring 54 maintained within the inlet section 3 is arranged to bear against the upstream end of the upstream valve member 4 so as to urge it into a closed position and maintain seal 7 against seat 8 when the lock sleeve 27 moves arm member 29 to in turn slide the valve into the closed position.

As best shown in FIGURE 3 of the drawing, there are three compression springs 50 spaced within the upstream disconnect section and six spaced compression springs 46 so as to provide a uniform arrangement and slide action of the various cylindrical ring sections of the disconnect unit. Also, though not shown in the drawing, at least three spaced arm members 29 are utilized through the body section 5 between the lock sleeve 27 and the inner valve member 4 so as to provide a uniform movement of the latter in effecting a fluid shut off and a disengagement of sections.

It is not intended to maintain the present invention to the exact design or construction shown in the present drawing inasmuch as a greater or a lesser number of parts may be utilized in forming the two portions of the disconnect unit or, alternatively, various other mechanical equivalents may be incorporated in the construction and assembly of the disconnect. For example, a slidable internal valve member may have plug means of a different configuration and different fluid passageway means between the upstream and downstream sections of the unit may be provided. Also, various other spring arrangements for effecting the desired biasing of the movable parts of the two different sections may be furnished in lieu of the particular design set forth. There is, however, a particular advantageous feature attained by the present design in having a quick snap-action type of disconnect while at the same time providing for a rapid stoppage of fluid flow in both sections of the unit and, more importantly, an inclusion of air into the unit during the coupling the two halves of the unit.

We claim as our invention:

1. A disconnect for a fluid supply line that minimizes both air entrapment and fluid loss, which comprises in combination, an upstream body section with a fluid inlet thereto and a fluid outlet port encompassed by a valve seating portion, a hollow upstream valve member concentrically and slidably positioned within said body section and having a downstream plug portion adapted to move against the seating portion of said body section, a downstream body section with fluid inlet port thereto in axial alignment with said upstream body section and encompassed by a valve seating portion, a downstream discharge end portion from said downstream body section, a hollow downstream valve member concentrically and slidably positioned within last said body section and having an upstream plug portion adapted to move against the seating portion of said downstream body section, spring means between last said body section and said downstream valve member at the downstream end of the latter biasing said plug portion in a normally closed position, said plug portions and said body sections having flat faces to meet one another and exclude air upon making a coupling, movable ball lock means carried in one of said disconnect sections and adapted to engage ball-groove means in the other body sections, a lock sleeve slidably encompassing at least a portion of said upstream body section and in addition having means for contacting said ball lock means whereby the longitudinal positioning of said lock sleeve will optionally hold said disconnect body sections in engagement with each other as well as optionally permit the disengagement thereof, and lever arm means extending from a recess in the wall of said upstream valve member through pivot support means in said upstream body section to recess means in the side of said lock sleeve member, whereby movement of said lock sleeve will slide said upstream valve member and provide a seating of the plug portion thereof with said seating portion of the upstream body section when the latter is being disengaged and conversely said lock sleeve will open the plug portion from such body section as the latter comes into contact with the downstream body section and is locked therewith by the movable ball lock means.

2. A disconnect for a fluid supply line that minimizes fluid loss and air entrapment, which comprises in combination, an upstream body section with a fluid inlet thereto and a fluid outlet port encompassed by a valve seating portion, a hollow upstream valve member concentrically and slidably positioned within said body section and having a downstream plug portion adapted to move against the seating portion of said body section, a downstream body-section with a fluid inlet port thereto in axial alignment with said upstream body section and encompassed by a valve seating portion, a downstream discharge end portion from said downstream body section, a hollow downstream valve member concentrically and slidably positioned within last said body section and having an upstream plug portion adapted to move against the seating portion of said downstream body section, spring means between last said body section and said downstream valve member at the downstream end of the latter biasing said plug portion in a normally closed position, said plug portions and said body sections having flat end faces to meet in a common parting plane and exclude air upon making a coupling of unit sections, ball-groove means in the exterior periphery of said downstream body section, a ring section connecting with said upstream body section and slidably fitting around the adjacent external portions of both said upstream and downstream body sections, said ring section having ball retaining opening means in alignment with the ball-groove means in said downstream body section and carrying at least one locking ball member, a lock sleeve slidably encompassing a portion of said upstream body section and said ring section, with said sleeve having a ball contacting shoulder portion and a ball receiving recessed portion in radial alignment with said locking ball member of said ring section, whereby the positioning of said lock sleeve will optionally hold said locking ball member in the groove means of said downstream body section as well as optionally permit the movement of the locking ball member out of said groove means and the disengagement of said body sections, and lever arm means extending from a recess in the wall of said upstream valve member through pivot support means in said upstream body section to recess means in the wall of said lock sleeve member, whereby movement of said lock sleeve will slide said upstream valve member and provide a seating of the plug portion thereof with said seating portion of the upstream body section when the latter is being disengaged and conversely said lock sleeve will open the plug portion from such body section as the latter comes into contact with the downstream body section and is locked therewith by the shoulder portion of the sleeve moving such ball member into the ball-groove means of the downstream body section.

3. The disconnect of claim 2 further characterized in that said upstream body section has a second slidable ring section held concentrically between the inner body portion thereof and first said ring section, with said second ring section having spring means biasing it in a downstream direction, and providing for the retention of said locking ball member in first said ring section after the latter has moved around said downstream body section with the ball member.

4. The disconnect of claim 2 further characterized in that said downstream body section has a slidable inner ring section circumscribing said downstream valve member, and spring means between said body section and said ring section provides for biasing the latter to move in an upstream direction as said upstream body section is disengaged and pulled away from the downstream section, with said movement limited by stop means between the ring section and its circumscribing body section.

5. A disconnect for a fluid supply line that minimizes fluid loss and air entrapment, which comprises in combination, an upstream body section with an axial fluid inlet thereto and an axial fluid outlet port, with the latter encompassed by a tapering valve seating portion, a hollow cylinder-form upstream valve member concentrically and slidably positioned within said body section and having a downstream plug portion adapted to be moved against the seating portion of said body section and effect a fluid seal therewith, and downstream faces of said body section and said plug portion sized to terminate in a flat common plane when in the seated position, a downstream body-section with a fluid inlet port thereto in axial alignment with said upstream body section and its fluid outlet port, a tapering valve seating portion, encompassing said fluid inlet port, an open downstream discharge end portion from said downstream body section, a hollow cylinderform downstream valve member concentrically and slidably positioned within last said body section and having an upstream plug portion adapted to move against the seating portion in said downstream body section, such body section and plug portion also sized to terminate in a flat common plane when in a closed position whereby there will be a flat face to face contact with the valve member of said upstream body section, compression spring means between last said body section and said downstream valve member at the downstream end of the latter providing biasing said plug portion thereof into a normally closed position, ball-groove means in the exterior periphery of said downstream body section, a concentric ring section connecting with said upstream body section and slidably fitting around the adjacent external portions of both said upstream and said downstream body sections, said ring section having ball retaining opening means in alignment with the ball-groove means in said downstream body section and carrying a ball lock means therein, a lock sleeve slidably encompassing a portion of said upstream body section and said ring section, with said sleeve having a ball contacting shoulder portion and ball receiving recess means in radial alignment with said ball lock means in said ring section, whereby the positioning of said lock sleeve will optionally hold said ball means in the groove means of said downstream body section as well as optionally permit the movement of the locking ball member out of said groove means and the disengagement of said body sections, a plurality of spaced lever arm means extending from spaced recess means in the wall of said upstream valve member through pivot support means in said upstream body section to recess means in the wall of said lock sleeve member, whereby movement of said lock sleeve will slide said upstream valve member and provide a seating of the plug portion thereof with said seating portion of the upstream body section when the latter is being disengaged and conversely said lock sleeve will open the plug portion from such body section as the latter comes into contact with the downstream body section and is locked therewith by the shoulder portion of the lock sleeve moving said ball lock means into the ball-groove means of the downstream body section.

References Cited

UNITED STATES PATENTS 3,295,553  1/1967  Garrett _____ 137—614.06

WILLIAM F. O'DEA, *Primary Examiner.*